Aug. 14, 1945.　　　　H. A. KEZER　　　　2,382,722
SOLAR HEATER
Filed Feb. 1, 1943　　　　2 Sheets-Sheet 2
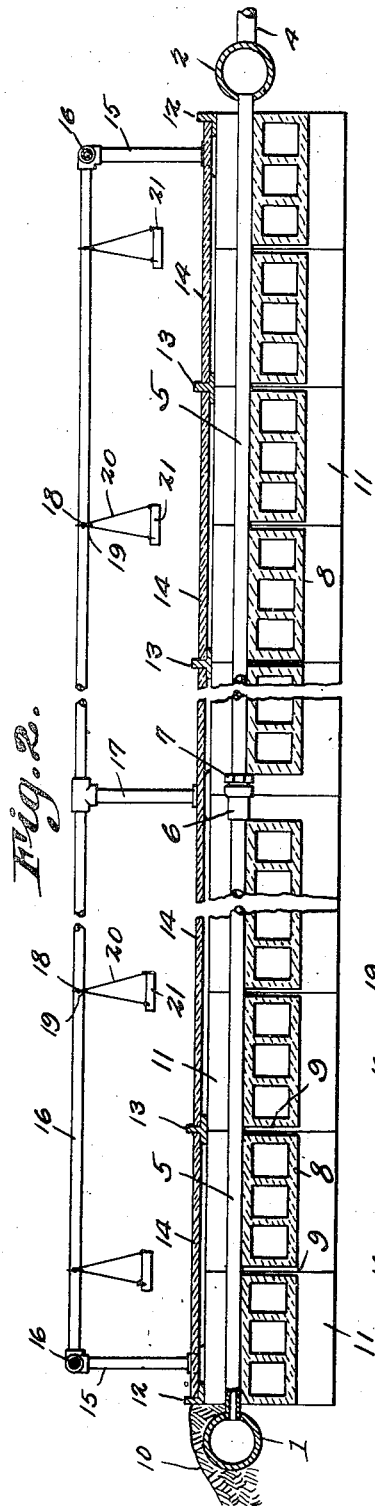
H. A. Kezer
INVENTOR.
BY C. A. Snow & Co.

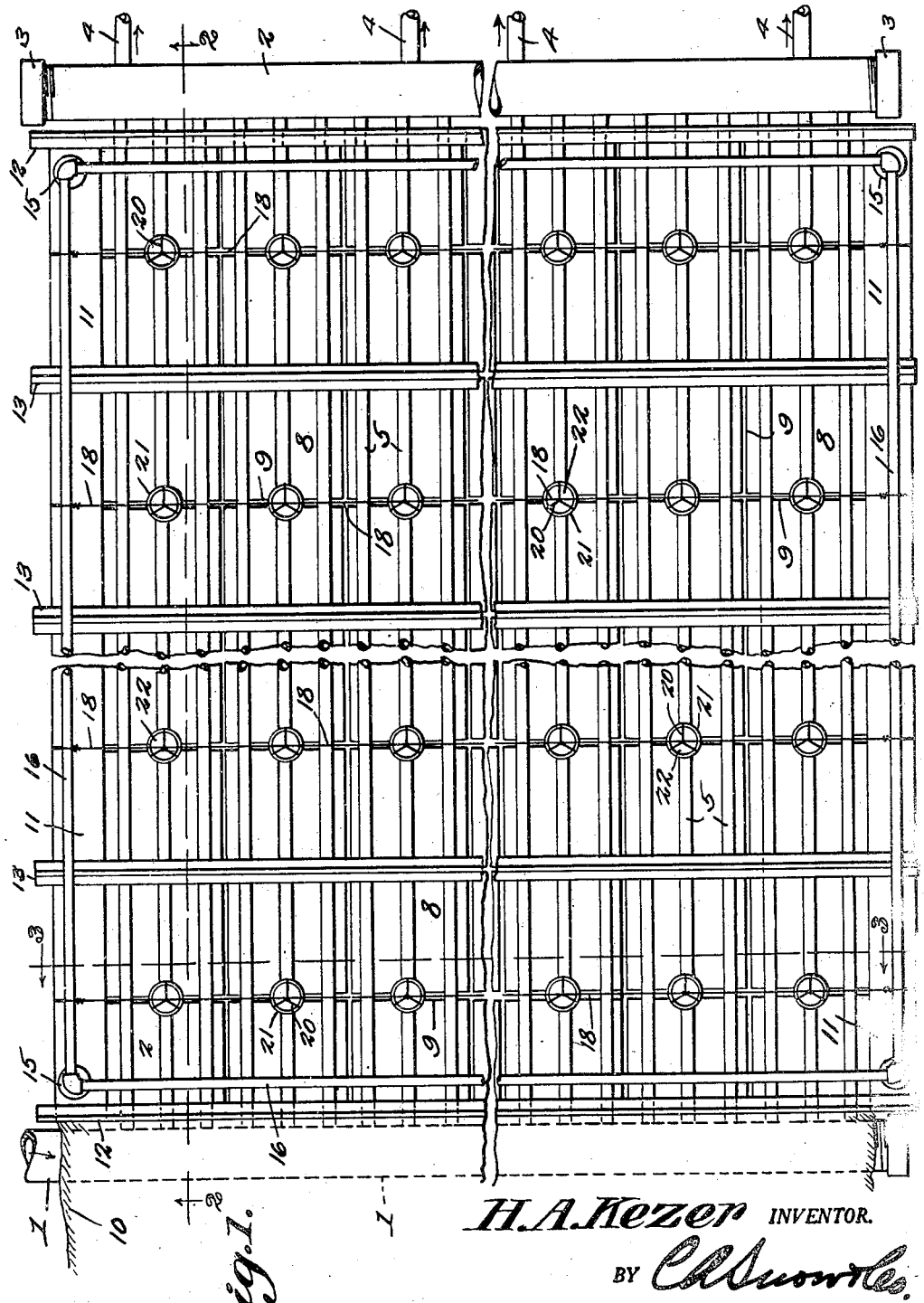

Patented Aug. 14, 1945

2,382,722

UNITED STATES PATENT OFFICE 2,382,722

SOLAR HEATER

Henry Amos Kezer, El Paso, Tex.

Application February 1, 1943, Serial No. 474,347

2 Claims. (Cl. 126—271)

This invention relates to a new and improved apparatus for destroying vegetation such as weeds, grass, etc., and also insects, fungus growth and bacteria occurring in soil to be cultivated.

An object of the invention is to treat the soil with water of high temperature which is brought to the desired degree of heat at points suitably located in the field under treatment and without requiring the use of fuel or complicated heating systems of an expensive nature.

A further object is to provide a novel form of heater whereby the water can be brought readily to the desired temperature, it being possible readily to transfer this heater to different localities where the rays of the sun can be utilized as the heating medium and large quantities of water of the high temperature desired, can be produced for application to the adjacent surfaces of the field under treatment.

A further object is to produce a solar heater which is cheap to construct, will afford ample drainage for precipitated moisture, and can easily be cleaned so as to be kept at high efficiency.

Another object is to produce a solar heater which is responsive not only to the direct unconcentrated rays of the sun but also has a supplemental means whereby the sun's rays can be condensed at desired points onto water conductors for the purpose of expediting the heating operation.

With the foregoing and other objects in view which will appear as the description proceeds, the invention consists of certain novel details of construction and combinations of parts hereinafter more fully described and pointed out in the claims, it being understood that changes may be made in the invention without departing from the spirit thereof as claimed.

In the accompanying drawings the preferred form of the invention has been shown.

In said drawings:

Figure 1 is a top plan view of the solar heater, portions being broken away.

Figure 2 is a section on line 2—2, Figure 1.

Figure 3 is a section on line 3—3, Figure 1.

Figure 4 is a section through one of the tube couplings employed.

Figure 5 is a perspective view of one of the heat-intensifying elements.

Referring to the figures by characters of reference, 1 and 2 designate headers in the form of pipes which are positioned preferably parallel to each other and spaced apart any desired distance, the pipe 1 constituting an intake header while the pipe 2 constitutes an output header. Header 2 is closed at its ends by caps 3 or the like and has one or more outlet pipes 4 extending therefrom. Water is adapted to be admitted into header 1 at one end from any suitable source of supply.

The two headers are joined by a plurality of parallel heating tubes 5 each of which preferably is formed of two or more sections which, as shown particularly in Fig. 4, can be joined by a coupling sleeve 6 screwed onto one end of one of the sections and slipped onto the other section, there being a packing gland 7 in the sleeve and about the latter section which can be compressed for the purpose of forming a tight seal, as will be obvious. By loosening this packing gland the two sections can readily be separated should it be desired to separate the parts. In the structure illustrated the entire water-conducting system is made up of two opposed groups, one composed of the header 1 and those tube sections 5 extending therefrom while the other is composed of the header 2 and the tube sections 5 extending therefrom. After these tubes and headers have been assembled to form the respective sections, they can be brought together by inserting the tubes 5 of one section into the coupling sleeves on the tubes of the other section so that the entire conducting system is thus quickly assembled.

For the purpose of supporting the conductors there is provided a floor 8 formed of rows of hollow tile, these rows being spaced apart to provide drainage openings 9. The tiles forming the floor can of course be supported on the ground or any other surface provided therefor. As the tubes 5 rest on this floor, the headers 1 and 2 will of course be supported thereby but nevertheless these headers can be further supported by embedding them in the soil adjacent to the floor as shown, for example, at 10 in Fig. 2.

The openings 9 are extended not only between the rows of tiles but also between the tiles of each row and located at opposed sides of the floor and along lines parallel with the tubes 5 are rows of tiles 11 forming walls which extend upwardly above the level of the tubes 5 and can also extend downwardly into the soil or other supporting surface. The side walls 11 support parallel oppositely disposed angle strips 12 located at opposed portions of the heater close to and parallel with the respective headers. These walls also support T-irons 13 which are interposed between and parallel with the strips 12. Glass plates 14 or plates made of any other suitable transparent material are supported by the T irons 13 and strips 12 as shown and these plates all cooperate to form a transparent cover for the area in which the tubes 5 are located.

Posts 15 are erected on the end portions of the walls 11 and are connected by railings 16. If desired intermediate posts 17 can also be used for supporting these railings. These railings not only serve as guards to restrain persons from walking onto the plates 14 but opposed railings constitute anchors for guy wires 18 which are stretched across the structure transversely of the tubes 5. The ends of the wires can be looped about the adjacent railing 16 so that it thus is possible to adjust the wires toward or from each other along the railings. Mounted on each wire are rings or loops 19 having downwardly diverging hangers 20 the lower ends of which are attached to frames 21 in which lenses 22 are mounted. These lenses are for the purpose of concentrating the rays of the sun on the tubes 5 thereunder and are so proportioned and positioned as to produce the most effective results. Obviously by the bodily adjustment of the guy wires and by the adjustment of the rings or loops 18 on these wires, the lenses 22 can be brought to most advantageous positions.

The capacity of the headers and of the one or more outlets 4 is less than the total capacity of the tubes 5. Thus the flow of water from header 1 to header 2 is retarded and the water, while passing through the tubes, is subjected to the action of the sun's rays for a longer period than would be possible should the outlet 4 and the header 2 have a capacity equal to or greater than that of the combined tubes. At seasons of the year when the heat of the sun's rays is less than that required to produce the most beneficial results, the wires 18 can be slid outwardly into position over the tubes and the lenses adjusted to points where they can act to concentrate the sun's rays on certain of the tubes. Obviously means other than the wire supports could be used for holding the lenses.

The glass plates are not secured in place but merely rest on the supporting rails or strips. Thus they can be removed readily for the purpose of cleaning them.

It is to be understood that one or more heaters such as described can be set up at different points in a large field or other area to be treated or, if preferred, each heater can be taken apart and reassembled at other points inasmuch as all of the parts are readily separable. When one or more of these heaters is located as stated, water therefrom, after being brought to high temperature, can be spread over the adjacent area of ground and obviously will serve to quickly kill and dissolve vegetation, fungus growth, insects and bacteria which are susceptible to high temperatures such as that of boiling water.

It has been found in practice that by utilizing means such as herein described, fields can be cleared of undesirable growth, etc., efficiently and at low cost.

What is claimed is:

1. A solar heater for heating water including a floor, opposed walls extending above the floor, an inlet header, an outlet header, tubes comprising connected sections extending toward each other from the respective headers and supported by the floor, transparent plates removably supported above the tubes, guard rails adjacent to opposed ends of the area defined by the plates, connections between the rails and extending over the plates, and lenses suspended from the connections above the plates and positioned for concentrating radiant solar energy upon the plates and tubes.

2. A solar heater for heating water including a floor, opposed walls extending above the floor, an inlet header, an outlet header, tubes comprising connected sections extending toward each other from the respective headers and supported by the floor, transparent plates removably supported above the tubes, a guard rail adjacent to the sides and ends of the area defined by the transparent plates, supporting elements connected to opposed portions of the guard rail and extending over the plates, and lenses suspended from said elements and above the plates and tubes and constituting means for concentrating radiant solar energy upon the tubes, said elements being mounted for sliding movement relative to each other along the guard rail and said lenses being supported for sliding movement relative to each other along said elements.

HENRY AMOS KEZER.